(12) United States Patent
Ueno (10) Patent No.: US 10,358,037 B2
(45) Date of Patent: Jul. 23, 2019

(54) VEHICULAR BRAKE SYSTEM

(71) Applicant: HONDA MOTOR CO., LTD., Minato-Ku, Tokyo (JP)

(72) Inventor: Masayuki Ueno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/773,895

(22) PCT Filed: Mar. 28, 2014

(86) PCT No.: PCT/JP2014/059324
§ 371 (c)(1),
(2) Date: Sep. 9, 2015

(87) PCT Pub. No.: WO2014/157683
PCT Pub. Date: Oct. 2, 2014

(65) Prior Publication Data
US 2016/0031326 A1 Feb. 4, 2016

(30) Foreign Application Priority Data
Mar. 28, 2013 (JP) .................................. 2013-069890

(51) Int. Cl.
*B60T 8/17* (2006.01)
*B60L 7/26* (2006.01)
(Continued)

(52) U.S. Cl.
CPC .............. *B60L 7/26* (2013.01); *B60L 3/0076* (2013.01); *B60L 3/102* (2013.01); *B60L 3/108* (2013.01);
(Continued)

(58) Field of Classification Search
CPC ......... B60T 2270/602; B60T 2270/604; B60T 8/50; B60T 13/586
See application file for complete search history.

(56) References Cited

U.S. PATENT DOCUMENTS

| 5,511,866 A | 4/1996 | Terada et al. |
| 9,493,075 B2 * | 11/2016 | Crombez .................. B60L 7/18 |

(Continued)

FOREIGN PATENT DOCUMENTS

| CN | 102211571 A | 10/2011 |
| DE | 10 2009 009 647 A1 | 8/2010 |

(Continued)

OTHER PUBLICATIONS

Patent Examination Report dated Dec. 24, 2015 in the counterpart Australian Application 2014244937.
(Continued)

*Primary Examiner* — Bradley T King
*Assistant Examiner* — Stephen M Bowes
(74) *Attorney, Agent, or Firm* — Carrier Blackman & Associates, P.C.; Joseph P. Carrier; Anne G. Sabourin (57) ABSTRACT

The present invention addresses the problem of providing a vehicular brake system that uses both friction braking force generated by an electrical braking unit and regenerative braking force generated by a regenerative braking unit, and can reduce a shortage in braking force when a slip has occurred on a wheel and antilock control is activated. The vehicular brake system includes: an electrical braking unit that supplies operational pressure generated in operational fluid by an electrical brake actuator to wheel cylinders and thereby applies friction braking force to wheels; a regenerative braking unit for applying regenerative braking force generated by an electrical motor to a driving wheel; and an antilock control unit for activating antilock control that increases and decreases the friction braking force to stop slip of a wheel.

3 Claims, 4 Drawing Sheets

(51) Int. Cl.
   *B60T 8/40*     (2006.01)
   *B60T 7/04*     (2006.01)
   *B60T 13/14*    (2006.01)
   *B60T 13/74*    (2006.01)
   *B60L 3/00*     (2019.01)
   *B60L 3/10*     (2006.01)
   *B60L 7/12*     (2006.01)
   *B60L 15/20*    (2006.01)
   *B60T 8/1761*   (2006.01)
   *B60L 50/16*    (2019.01)

(52) U.S. Cl.
   CPC .......... *B60L 7/12* (2013.01); *B60L 15/2009* (2013.01); *B60L 50/16* (2019.02); *B60T 7/042* (2013.01); *B60T 8/1761* (2013.01); *B60T 8/4081* (2013.01); *B60T 13/146* (2013.01); *B60T 13/745* (2013.01); *B60L 2240/12* (2013.01); *B60L 2240/423* (2013.01); *B60L 2240/461* (2013.01); *B60L 2240/465* (2013.01); *B60L 2250/26* (2013.01); *B60T 2270/602* (2013.01); *Y02T 10/645* (2013.01); *Y02T 10/70* (2013.01); *Y02T 10/7077* (2013.01); *Y02T 10/72* (2013.01); *Y02T 10/7275* (2013.01)

(56)          References Cited

U.S. PATENT DOCUMENTS

| | | | |
|---|---|---|---|
| 2004/0046448 A1* | 3/2004 | Brown | B60K 6/44 303/152 |
| 2008/0100132 A1 | 5/2008 | Jeon et al. | |
| 2010/0250083 A1* | 9/2010 | Takahashi | B60T 8/1755 701/70 |
| 2011/0241419 A1 | 10/2011 | Ohkubo et al. | |
| 2012/0056471 A1 | 3/2012 | Plewnia et al. | |
| 2012/0130581 A1 | 5/2012 | Semsey et al. | |
| 2012/0265419 A1 | 10/2012 | Kim | |
| 2012/0323459 A1* | 12/2012 | Okubo | B60T 8/172 701/74 |
| 2013/0173127 A1* | 7/2013 | Nakatsu | B60L 3/102 701/70 |
| 2013/0211644 A1* | 8/2013 | Yokoyama | B60W 20/14 701/22 |
| 2014/0277983 A1* | 9/2014 | Bayar | B60L 7/18 701/71 |

FOREIGN PATENT DOCUMENTS

| | | | |
|---|---|---|---|
| JP | H06-351104 A | | 12/1994 |
| JP | 10297462 A | * | 11/1998 |
| JP | 2000-062590 A | | 2/2000 |
| JP | 2000-108873 A | | 4/2000 |
| JP | 2003-306137 A | | 10/2003 |
| JP | 2003306137 A | | 10/2003 |
| JP | 2006-025485 A | | 1/2006 |
| JP | 2006025485 A | | 1/2006 |
| JP | 2012-126352 A | | 7/2012 |
| JP | 2012126352 A | | 7/2012 |
| JP | 2013043495 A | | 3/2013 |
| WO | 2011/015422 A1 | | 2/2011 |

OTHER PUBLICATIONS

Notice of Reasons for Rejection to the counterpart Japanese Application JP2015-508799 dated Apr. 26, 2016.

Extended European Search Report issued in the counterpart European application 14776251.2, dated Jan. 17, 2017.

Office Action dated Jun. 7, 2017 issued in the corresponding Chinese Patent Application 201480014166.7 with the English translation thereof.

* cited by examiner

100
VEHICULAR BRAKE SYSTEM

TECHNICAL FIELD

The present invention relates to a vehicular brake system.

BACKGROUND ART

For example, Patent Literature 1 discloses a braking force control device that uses both mechanical braking force (friction braking force) and regenerative braking force, and further improves the stability of a vehicle during braking by ABS (Antilock Brake System) control.

RELATED ART DOCUMENT

Patent Literature

Patent Literature 1: JP 2000-062590 A

DISCLOSURE OF THE INVENTION

Problems to be Solved by the Invention

By the braking force control device disclosed by Patent Literature 1, friction braking force is applied to all of four wheels, and regenerative braking force is applied only to driving wheels (left and right front wheels) driven by a driving motor as a movement power source. Consequently, regenerative braking force and friction braking force are applied to the driving wheels while only friction braking force is applied to the non-driving wheels (left and right rear wheels). In such a manner, as the braking forces applied to the driving wheels and the non-driving wheels are caused to be unbalanced with each other, which sometimes make the behavior of a vehicle unstable during braking, depending on the state of a road surface.

If wheels slip and the behavior of a vehicle becomes unstable during braking, an ABS device is activated. The ABS device adjusts friction braking force and controls the attitude of the vehicle. Accordingly, the regenerative braking force is decreased during operation of the ABS device, and generation of regenerative braking force is thereby stopped. The ABS device decreases the friction braking force so as to make a wheel recover from slip. Further, the ABS device is configured to stabilize the vehicle by increasing or decreasing the friction braking force. Accordingly, for example, when a wheel recovers from a slip and the friction braking force is increased, it is necessary to generate braking force that compensates the regenerative braking force having been decreased during operation of the ABS device and the friction braking force having been decreased by operation of the ABS device. If the braking force is not compensated, the braking force generated on the vehicle sometimes become short of a requested braking force requested by the driver.

In this situation, an object of the invention is to provide a vehicular brake system that uses both friction braking force generated by an electrical braking unit and regenerative braking force generated by a regenerative braking unit, and can reduce a shortage in braking force when a slip has occurred on a wheel and antilock control is activated.

Means for Solving the Problems

In order to solve the above-described problem, according to the invention, a vehicular brake system includes: an electrical braking unit that supplies operational pressure generated in operational fluid by an electrical brake actuator to wheel cylinders and thereby applies friction braking force to wheels; a regenerative braking unit for applying regenerative braking force generated by an electrical motor to a driving wheel; and an antilock control unit for activating antilock control that increases and decreases the friction braking force to stop slip of a wheel, wherein the vehicular brake system is provided on a vehicle having the wheels including the driving wheel rotationally driven by then electrical motor, and wherein when the antilock control unit determines that at least one slip wheel has occurred and activates the antilock control, the antilock control unit maintains a state where the regenerative braking force is applied to the driving wheel.

In this aspect of the invention, by a vehicular brake system capable of applying friction braking force and regenerative braking force to wheels, when at least one slip wheel has occurred, it is possible to activate antilock control while maintaining the regenerative braking force applied to a driving wheel. Thus, when antilock control is activated, both the friction braking force and the regenerative braking force are applied to the wheel, and antilock control can be activated such as to generate braking force without a shortage compared with requested braking force requested by a driver.

Further, in another aspect of the invention, the antilock control unit increases and decreases the operational pressure by the electrical brake actuator while the antilock control is activated.

In this aspect of the invention, operational pressure can be increased and decreased by an electrical brake actuator while the antilock control is activated. Accordingly, friction braking force applied to a wheel can be adjusted by the electrical brake actuator.

The antilock control unit of the vehicular brake system in still another aspect of the invention maintains the regenerative braking force constant while the antilock control is activated.

In this aspect of the invention, when antilock control is activated, the regenerative braking force applied to a driving wheel is maintained constant. Accordingly, when antilock control is activated, regenerative braking force can also be used. In addition, when the antilock control is activated, shortage in the braking force can be reduced.

While the antilock control is activated, the antilock control unit of the vehicular brake system in yet another aspect of the invention subtracts a braking force corresponding to the friction braking force applied to a non-driving wheel out of the wheels, the non-driving wheel being not the driving wheel, from the regenerative braking force applied to the driving wheel.

In this aspect of the invention, it is possible to avoid generation of excessive braking force while the antilock control is activated.

When the antilock control unit of the vehicular brake system in another aspect of the invention has determined that slip ratio of the slip wheel has become smaller than or equal to a predetermined value, the antilock control unit opens an opening-closing unit for a supply passage supplying the operational pressure to the wheel cylinder provided at the slip wheel, to supply the operational pressure from the supply passage to the wheel cylinder, thereby increases the friction braking force applied to the slip wheel, and decreases the regenerative braking force that is applied to the driving wheel by the regenerative braking unit.

In this aspect of the invention, it is possible to increase the friction braking force when the slip of the slip wheel has stopped, and further decrease the regenerative braking force applied to the driving wheel. Accordingly, it is possible to prevent a wheel from being applied an excessive braking force.

While the antilock control is activated, the antilock control unit of the vehicular brake system in still another aspect of the invention opens an opening-closing unit for a supply passage supplying the operational pressure to the wheel cylinder provided at the slip wheel, to supply the operational pressure from the supply passage to the wheel cylinder, thereby increases the friction braking force applied to the slip wheel, and decreases the regenerative braking force that is applied to the driving wheel by the regenerative braking unit.

In this aspect of the invention, it is possible to decrease the regenerative braking force while increasing the friction braking force when the antilock control is activated by the antilock control unit. Accordingly, it is possible to prevent a wheel from being applied an excessive braking force while the antilock control is activated.

Advantages of the Invention

According to the invention, it is possible to provide a vehicular brake system that uses both friction braking force generated by an electrical braking unit and regenerative braking force generated by a regenerative braking unit, and can reduce a shortage in braking force when a slip occurs on a wheel and antilock control is activated.

EMBODIMENT FOR CARRYING OUT THE INVENTION

In the following, an embodiment according to the present invention will be described in detail, referring to the drawings, as appropriate.

Figure 1:
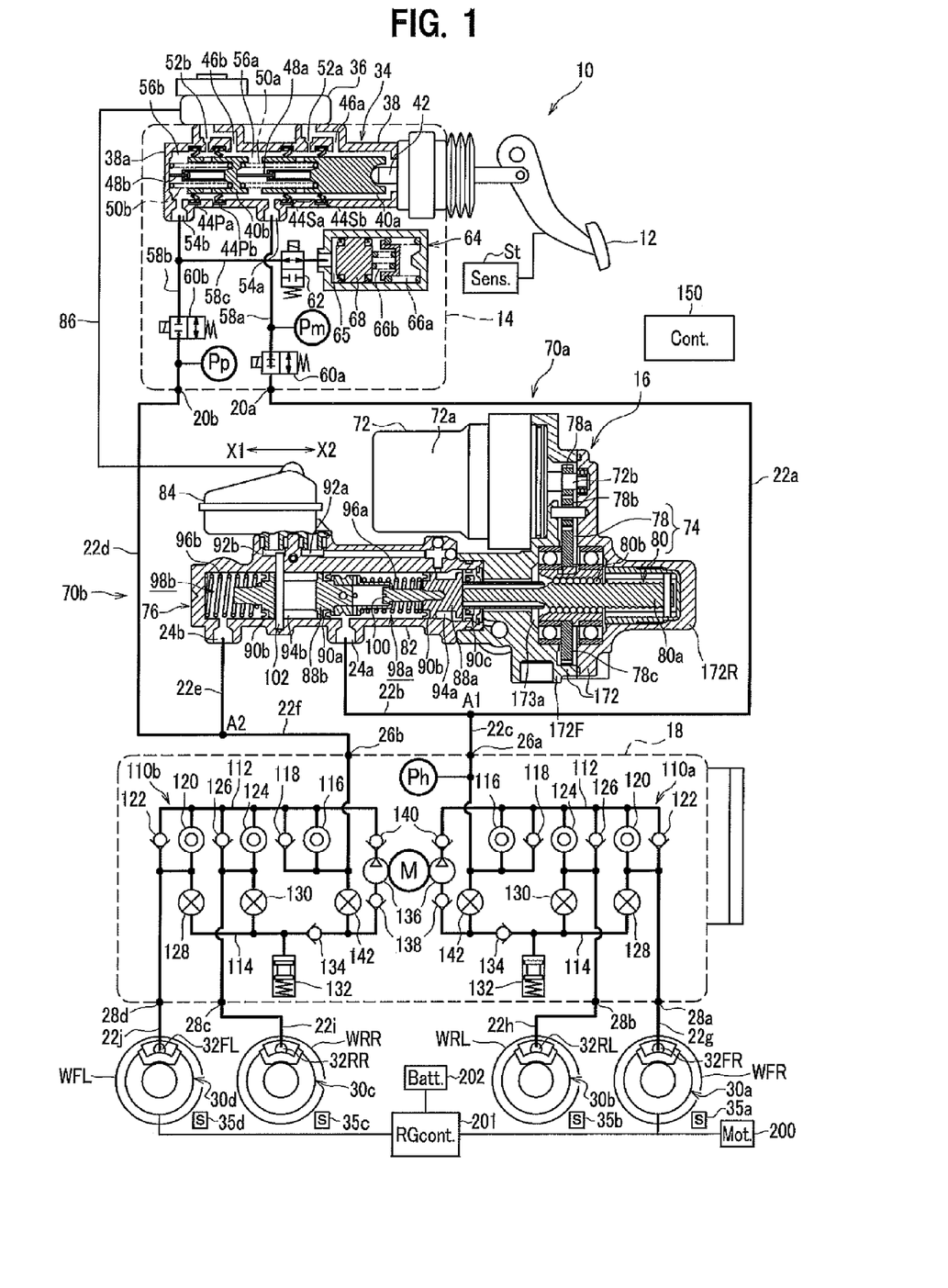
FIG. 1 shows the schematic configuration of a vehicular brake system.
Figure 2A:
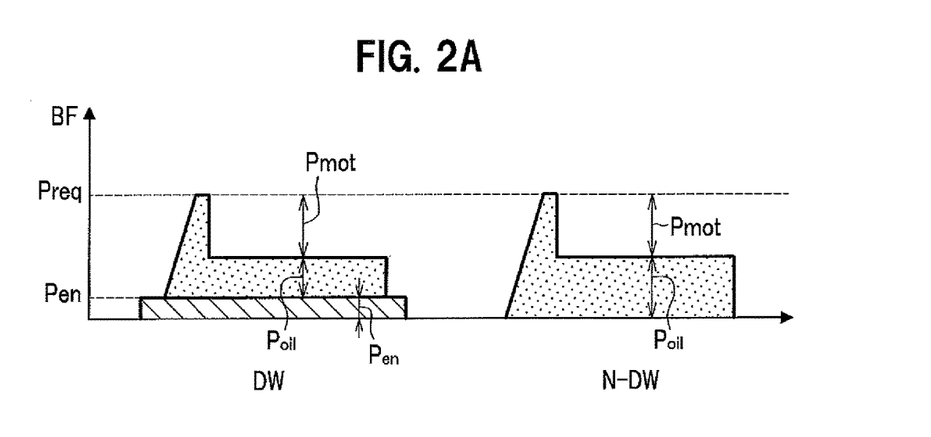
FIG. 2A shows friction braking forces applied respectively to driving wheels and non-driving wheels.
Figure 2B:
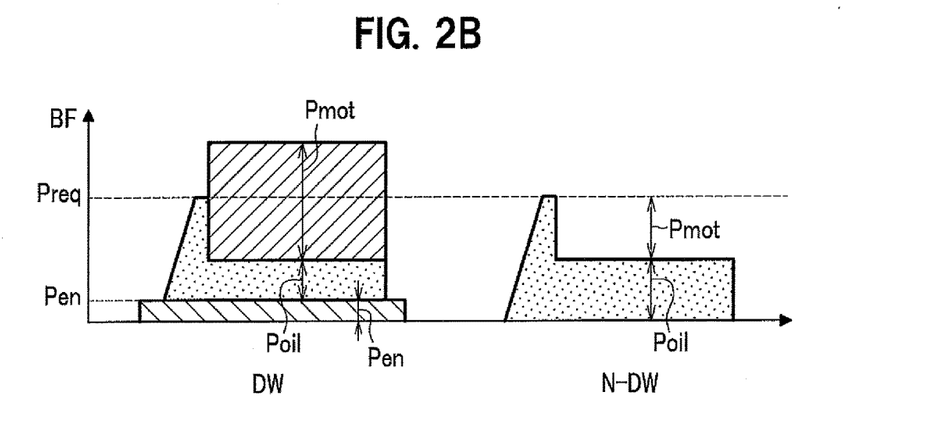
FIG. 2B shows a state where a regenerative driving force is applied to the driving wheels.

FIG. 1 shows the schematic configuration of a vehicular brake system according to an embodiment of the invention. FIG. 2A shows respective friction braking forces applied to driving wheels and non-driving wheels. FIG. 2B shows a state where a regenerative driving force is applied to the driving wheels.

Incidentally, in FIGS. 2A and 2B, the figure (DW) on the left side shows a driving wheel and the figure (N-DW) on the right side shows a non-driving wheel. The vertical axis represents braking force (BF).

A vehicular brake system 10 shown in FIG. 1 is provided with both a brake system of a by-wire type for normal use, which operates a brake by transmitting an electrical signal, and a conventional hydraulic brake system for failsafe use, which operates a brake by transferring a hydraulic pressure (hydraulic brake pressure).

For this arrangement, a vehicular brake system 10 shown in FIG. 1 basically includes, as separated units, a hydraulic pressure generating device (input device 14) for making a brake fluid, the brake fluid being an operating fluid, generate a hydraulic pressure corresponding to an input of operation of a brake operation section such as a brake pedal 12 by a driver, a pedal stroke sensor St (Sens.) for measuring an operation amount (stroke) when the brake pedal 12 is subjected to pedaling operation, an electrical brake actuator (motor cylinder device 16) for generating an operating pressure (hydraulic brake pressure) of an operating fluid (brake fluid) supplied to the wheel cylinders 32FR, 32RL, 32RR, and 32FL of respective wheels (front right wheel WFR, rear left wheel WRL, rear right wheel WRR, and front left wheel WFL), and a vehicle behavior stabilizing device 18 (hereinafter, referred to as a VSA (vehicle stability assist) device 18, VSA; registered trademark) for assisting stabilization of the vehicle.

These devices, namely, the input device 14, the motor cylinder device 16, and the VSA device 18 are connected by tube passages (hydraulic passages) formed by a tube member, for example, a hose or a tube. Further, as a by-wire brake system, the input device 14 and the motor cylinder device 16 are electrically connected by a harness (not shown).

First, hydraulic passages will be described. With a connection point A1 in FIG. 1 (a little lower than the center) as a reference, a connection port 20a of the hydraulic-pressure generation device 14 and the connection point A1 are connected by a first piping tube 22a. Further, an output port 24a of the motor cylinder device 16 and the connection point A1 are connected by a second piping tube 22b. Still further, an inlet port 26a of the VSA device 18 and the connection point A1 are connected by a third piping tube 22c.

With another connection point A2 in FIG. 1 as a reference, another connection port 20b of the input device 14 and the connection point A2 are connected by a fourth piping tube 22d; another output port 24b of the motor cylinder device 16 and the connection point A2 are connected by a fifth piping tube 22e; and further, another inlet port 26b of the VSA device 18 and the connection point A2 are connected by a sixth piping tube 22f.

The VSA device 18 is provided with a plurality of outlet ports 28a to 28d. The first outlet port 28a is connected, by a seventh piping tube 22g, with the wheel cylinder 32FR of a disk brake mechanism 30a provided at the front right wheel WFR. The second outlet port 28b is connected, by an eighth piping tube 22h, with the wheel cylinder 32RL of a disk brake mechanism 30b provided at the rear left wheel WRL. The third outlet port 28c is connected, by a ninth piping tube 22i, with the wheel cylinder 32RR of a disk brake mechanism 30c provided at the rear right wheel WRR. The fourth outlet port 28d is connected, by a tenth piping tube 22j, with a wheel cylinder 32FL of a disk brake mechanism 30d provided at the front left wheel WFL.

Herein, brake fluid is supplied, through the piping tubes 22g-22j connected with the respective outlet ports 28a-28d, to the respective wheel cylinders 32FR, 32RL, 32RR, and 32FL of the disk brake mechanisms 30a-30d. Rise in the hydraulic brake pressure in the wheel cylinders 32FR, 32RL, 32RR, or 32FL operates the corresponding wheel cylinders 32FR, 32RL, 32RR, or 32FL, thus the friction force with the corresponding wheel (front right wheel WFR, rear left wheel WRL, rear right wheel WRR, or front left wheel WFL) increases, and braking force is thereby applied. A braking force generated in such a manner by a rise in the hydraulic brake pressure in the each wheel cylinder 32FR, 32RL. 32RR, or 32FL will be hereinafter referred to as a friction braking force Poil.

Further, each of the front right wheel WFR, the rear left wheel WRL, the rear right wheel WRR, and the front left wheel WFL is provided with a wheel speed sensor 35a, 35b, 35c, or 35d (S) for detecting the wheel speed; the each of the wheel speed sensor 35a, 35b, 35c, and 35d measures the corresponding wheel speed; and each measurement signal generated by the measuring is input to a control unit 150 (Cont.).

Incidentally, the vehicular brake system 10 in the present embodiment can be mounted on a vehicle provided with an electrical motor 200 as a movement power source, such as a hybrid vehicle with an engine (internal combustion engine) and the electrical motor 200 (Mot.) as movement power sources, or an electrical vehicle with only the electrical motor 200 as a movement power source.

The electrical motor 200 is arranged on the vehicle to drive, for example, two front wheels (front right wheel WFR, front left wheel WFL). In this case, the two front wheels serve as driving wheels, and the two rear wheels (rear left wheel WRL, rear right wheel WRR) serve as non-driving wheels.

A regeneration control device 201 (RGcont.) is connected to the electrical motor 200. The regeneration control device 201 has a function to charge a battery 202 (Batt.) with an electrical power (regenerative power) generated by the electrical motor 200 with a torque input from driving wheels, and is controlled by instructions input from the control unit 150. For example, upon input of an instruction from the control unit 150 to make the electrical motor 200 generate a regenerative power and thereby generate a braking force (regenerative braking force Pmot), the regeneration control device 201 switches the electrical motor 200 to 'a power generator' and functions to charge the battery 202 (Batt.) with the regenerative power generated by the electrical motor 200.

Further, the regeneration control device 201 is configured to be able to adjust the strength of the regenerative braking force Pmot generated by the electrical motor 200, for example, by varying a field current to be supplied to, for example, the electrical motor 200 and thus adjusting the generated power amount of the regenerative power by the electrical motor 200.

Accordingly, in the present embodiment, a regeneration brake unit is configured, including the control unit 150, the electrical motor 200, and the regeneration control device 201. Incidentally, a known technology can be used as a technology for making the regeneration control device 201 control the electrical motor 200 to generate the regenerative braking force Pmot.

The input device 14 includes a tandem type master cylinder 34 capable of generating a hydraulic pressure of the brake fluid by operation of the brake pedal 12 by the driver, and a reservoir (first reservoir 36) attached to the master cylinder 34. Inside a cylinder tube 38 of the master cylinder 34, two pistons (secondary piston 40a and a primary piston 40b) are slidably arranged, wherein the two pistons 40a and 40b are separated from each other by a certain distance along the axial direction of the cylinder tube 38. The secondary piston 40a is disposed adjacent to the brake pedal 12 and connected with the brake pedal 12 through a push rod 42. The primary piston 40b is disposed at a longer distance than the piston 40a is from the brake pedal 12.

Further, to the inner wall of the cylinder tube 38, there are attached cup seals 44Pa, 44Pb in a pair of ring shapes in slidable contact with the outer circumference of the primary piston 40b, and cup seals 44Sa, 44Sb in a pair of ring shapes in slidable contact with the outer circumference of the secondary piston 40a. Further, a spring member 50a is provided between the secondary piston 40a and the primary piston 40b, and another spring member 50b is provided between the primary piston 40b and the side end portion 38a, on the closed end side, of the cylinder tube 38.

Still further, a guide rod 48b is arranged, extending along the sliding direction of the primary piston 40b from the side end portion 38a of the cylinder tube 38. The primary piston 40b is guided by the guide rod 48b, and thus slide.

Yet further, a guide rod 48a is arranged, extending along the sliding direction of the secondary piston 40a from the end portion, on the secondary piston 40a side, of the primary piston 40b. The secondary piston 40a is guided by the guide rod 48a, and thus slides.

The secondary piston 40a and the primary piston 40b are connected by the guide rod 48a and serially disposed. Details of the guide rods 48a, 48b will be described later.

Further, the cylinder tube 38 of the master cylinder 34 is provided with two supply ports (second supply port 46a, first supply port 46b), two relief ports (second relief port 52a, first relief port 52b), and two output ports 54a, 54b. Herein, the second supply port 46a, the first supply port 46b, the second relief port 52a, and the first relief port 52b are arranged such as to join with each other and communicate with a reservoir chamber (not shown) in the first reservoir 36.

Still further, the pair of the cup seal 44Sa, 44Sb in slidable contact with the outer circumference of the secondary piston 40a are disposed along the sliding direction of the secondary piston 40a with the second relief port 52a in between. Further, the pair of cup seals 44Pa, 44Pb in slidable contact with the outer circumference of the primary piston 40b are disposed in the sliding direction of the primary piston 40b with the first relief port 52b in between.

Further, inside the cylinder tube 38 of the master cylinder 34, there are provided a second pressure chamber 56a and a first pressure chamber 56b that generate a hydraulic pressure corresponding to a pedal effort on the brake pedal 12 by the driver. The second pressure chamber 56a is arranged such as to communicate with the connection port 20a through a second hydraulic pressure passage 58a, and the first pressure chamber 56b is arranged such as to communicate with the other connection port 20b through the first hydraulic pressure passage 58b.

The space between the first pressure chamber 56b and the second pressure chamber 56a is tightly fluid-sealed by the pair of cup seals 44Pa, 44Pb. Further, the brake pedal 12 side of the second pressure chamber 56a is tightly fluid-sealed by the pair of cup seals 44Sa, 44Sb.

The first pressure chamber 56b is arranged such as to generate a hydraulic pressure corresponding to the displacement of the primary piston 40b, and the second pressure chamber 56a is arranged such as to generate a hydraulic pressure corresponding to the displacement of the secondary piston 40a.

The secondary piston 40a is connected with the brake pedal 12 through a pushrod 42 to be displaced inside the cylinder tube 38, accompanying the operation of the brake pedal 12. Further, the primary piston 40b is displaced by a hydraulic pressure generated in the second pressure chamber

56*a* by the displacement of the secondary piston 40*a*. That is, the primary piston 40*b* is displaced in association with the secondary piston 40*a*.

A pressure sensor Pm is arranged between the master cylinder 34 and the connection port 20*a* and on the upstream side of the second hydraulic pressure passage 58*a*, a second shut-off valve 60*a* is provided on the downstream side of the second hydraulic pressure passage 58*a*, wherein the second shut-off valve 60*a* is a solenoid valve of a normal open type. The pressure sensor Pm measures the hydraulic pressure in the second hydraulic pressure passage 58*a* and on the upstream side, in other words, the master cylinder 34 side with respect to the second shut-off valve 60*a*.

A first shut-off valve 60*b* is provided between the master cylinder 34 and the other connection port 20*b* and on the upstream side of the first hydraulic pressure passage 58*b*, the first shut-off valve 60*b* being a solenoid valve of a normal open type. A pressure sensor Pp is provided on the downstream side of the first hydraulic pressure passage 58*b*. The pressure sensor Pp measures the hydraulic pressure in the first hydraulic pressure passage 58*b* on the downstream side, in other words, on the side of the wheel cylinders 32FR, 32RL, 32RR, and 32FL with respect to the first shut-off valve 60*b*.

Normal open regarding the second shut-off valve 60*a* and the first shut-off valve 60*b* refers to a valve arranged such that the normal position (the position of the valve body when current is not applied) is in a state (normally open) at an open position. Incidentally, FIG. 1 shows a valve-closed state where current is applied to the solenoids of the second shut-off valve 60*a* and the first shut-off valve 60*b*, and the valve bodies (not shown) of are operated.

The first hydraulic pressure passage 58*b* between the master cylinder 34 and the first shut-off valve 60*b* is provided with a branched hydraulic pressure passage 58*c* branched from the first hydraulic pressure passage 58*b*. A third shut-off valve 62, which is a solenoid valve of a normal close type, and a stroke simulator 64 are serially connected to the branched hydraulic pressure passage 58*c*. Normal close regarding the third shut-off valve 62 refers to a valve arranged such that the normal position (the position of the valve body when current is not applied) is in a state (normally closed) at a close position. Incidentally, FIG. 1 shows a valve-open state where current is applied to the solenoid of the third shut-off valve 62, and the valve body (not shown) is operated.

The stroke simulator 64 is a device that applies a stroke and a reaction force on the pedaling operation of the brake pedal 12 during by-wire control, and makes the driver feel as if a braking force were generated by a pedal effort. The stroke simulator 64 is disposed on the first hydraulic pressure passage 58*b* and on the master cylinder 34 side with respect to the first shut-off valve 60*b*. The stroke simulator 64 is provided with a hydraulic pressure chamber 65 communicating with the branched hydraulic pressure passage 58*c* so that brake fluid flowed out from the first pressure chamber 56*b* of the master cylinder 34 can be absorbed through the above-described hydraulic pressure chamber 65.

Further, the stroke simulator 64 is provided with a first return spring 66*a* with a larger spring constant and a second return spring 66*b* with a smaller spring constant, which are disposed serial with each other, and a simulator piston 68 urged by the first and second return springs 66*a*, 66*b*. Herein, the stroke simulator 64 is arranged such that the increase gradient of the pedal reaction force is set small during the early stage of pedaling the brake pedal 12, and the pedal reaction force is set large during the later stage of pedaling so that the pedal feeling of the brake pedal 12 becomes equal to the pedal feeling at the time of pedaling operation of an existing master cylinder 34.

That is, the stroke simulator 64 is configured to generate a reaction force corresponding to the hydraulic pressure of the brake fluid flowing out from the first pressure chamber 56*b*, and applies this reaction force to the brake pedal 12 through the master cylinder 34. The details of the master cylinder 34 will be described later.

The configuration of the hydraulic passages is roughly categorized into a second hydraulic system 70*a* that connects the second pressure chamber 56*a* of the master cylinder 34 and the plurality of wheel cylinders 32FR and 32RL, and a first hydraulic system 70*b* that connects the first pressure chamber 56*b* of the master cylinder 34 and the plurality of wheel cylinders 32RR and 32FL.

The second hydraulic pressure system 70*a* is configured by the second hydraulic pressure passage 58*a* that connects the output port 54*a* of the master cylinder 34 (cylinder tube 38) of the input device 14 and the connection port 20*a*; piping tubes 22*a*, 22*b* that connect the connection port 20*a* of the input device 14 and the outlet port 24*a* of the motor cylinder device 16; piping tubes 22*b*, 22*c* that connect the output port 24*a* of the motor cylinder device 16 and the inlet port 26*a* of the VSA device 18; and piping tunes 22*g*, 22*h* that connect the outlet ports 28*a*, 28*b* of the VSA device 18 and the respective wheel cylinders 32FR, 32RL.

The first hydraulic system 70*b* includes the first hydraulic pressure passage 58*b* connecting the output ports 54*b* of the master cylinder 34 (cylinder tube 38) of the input device 14 and the other connection port 20*b*; the piping tubes 22*d*, 22*e* connecting the other connection port 20*b* of the input device 14 and the output port 24*b* of the motor cylinder device 16; the piping tubes 22*e*, 22*f* connecting the output port 24*b* of the motor cylinder device 16 and the inlet port 26*b* of the VSA device 18; and the piping tubes 22*i*, 22*j* connecting the outlet ports 28*c*, 28*d* of the VSA device 18 and the respective wheel cylinders 32RR, 32FL.

The motor cylinder device 16 includes an electrical machine (electrical motor 72), an actuator mechanism 74, and a cylinder mechanism 76 urged by the actuator mechanism 74.

The actuator mechanism 74 is arranged on the output shaft 72*b* side of the electrical motor 72 and includes a gear mechanism (deceleration mechanism) 78, the plurality of gears of the gear mechanism 78 engaging with each other to transmit the rotational driving force of the electrical motor 72; and a ball screw assembly 80 that includes a ball screw shaft 80*a* and balls 80*b*, the ball screw shaft 80*a* moves forward and backward along the axial direction by that the above-described rotational driving force is transmitted through the gear mechanism 78.

In the present embodiment, the ball screw assembly 80 is housed in a mechanism housing section 173*a* of an actuator housing 172, together with the gear mechanism 78.

The cylinder mechanism 76 includes a cylinder main body 82 substantially in a cylindrical shape, and a second reservoir 84 attached to the cylinder main body 82. The second reservoir 84 is connected with the first reservoir 36 attached to the master cylinder 34 of the input device 14 by a piping tube 86, and the brake fluid stored in the first reservoir 36 is supplied into the second reservoir 84 through the piping tube 86. Incidentally, the piping tube 86 may be provided with a tank for storing the brake fluid.

The open end portion (open end) of the cylinder main body 82 substantially in a cylindrical shape is fitted to an actuator housing 172 configured by a housing main body 172F and a housing cover 172R so that the cylinder main body 82 and the actuator housing 172 are connected, and the motor cylinder device 16 is thus configured.

In the cylinder main body 82, a second slave piston 88a and a first slave piston 88b are slidably arranged such as to be separate from each other at a certain distance along the axial direction of the cylinder main body 82. The second slave piston 88a is disposed adjacent to the ball screw assembly 80 side, and contacts one end portion of the ball screw shaft 80a to be displaced integrally with the ball screw shaft 80a in the direction represented by arrow X1 or X2. The first slave piston 88b is disposed farther from the ball screw assembly 80 side than the second slave piston 88a is.

The electrical motor 72 in the present embodiment is covered by a motor casing 72a formed separately from the cylinder main body 82. The output shaft 72b of the electrical motor 72 is disposed substantially in parallel to the sliding direction (axial direction) of the second slave piston 88a and the first slave piston 88b.

The rotational driving of the output shaft 72b is transmitted to the ball screw assembly 80 through the gear mechanism 78.

The gear mechanism 78 is configured, for example, by three gears, namely, a first gear 78a attached to the output shaft 72b of the electrical motor 72, a third gear 78c that rotates the ball 80b around the axial direction of the ball screw shaft 80a, the ball 80b moving the ball screw shaft 80a forward and backward along the axial direction, and a second gear 78b that transmits the rotation of the first gear 78a to the third gear 78c. Herein, the third gear 78c rotates around the axial line of the ball screw shaft 80a.

With the above-described structure, the actuator mechanism 74 in the present embodiment converts the rotational driving force of the output shaft 72b of the electrical motor 72 into the forward-backward driving force (linear driving force) of the ball screw shaft 80a.

A pair of slave cup seals 90a, 90b is attached, through an annular stepped portion, to the outer circumferential surface of the first slave piston 88b. A first back chamber 94b, which communicates with a later-described reservoir port 92b, is formed between the pair of slave cup seals 90a, 90b.

Incidentally, a second return spring 96a is arranged between the second and first slave pistons 88a, 88b. A first return spring 96b is arranged between the first slave piston 88b and the side end portion of the cylinder main body 82.

Further, an annular guide piston 90c, which tightly fluid-seals the space between the outer circumferential surface of the second slave piston 88a and the mechanism housing section 173a and movably guides the second slave piston 88a along the axial direction of the second slave piston 88a, is provided posterior to the second slave piston 88a such as to close the cylinder main body 82 as a seal member. It is preferable that a slave cup seal (not shown) is attached to the inner circumferential surface of a guide piston 90c which the second slave piston 88a penetrates, and the space between the second slave piston 88a and the guide piston 90c is tightly fluid-sealed. Further, a slave cup seal 90b is attached to the front outer circumferential surface of the second slave piston 88a through an annular stepped portion.

By this configuration, brake fluid charged into the cylinder main body 82 is trapped in the cylinder main body 82 by the guide piston 90c and is thus prevented from flowing out to the side of the actuator housing 172.

Incidentally, a second back chamber 94a communicating with a later-described reservoir port 92a is formed between the guide piston 90c and the slave cup seal 90b.

The cylinder main body 82 of the cylinder mechanism 76 is provided with two reservoir ports 92a, 92b and two output ports 24a, 24b. Herein, the reservoir ports 92a (92b) are arranged such as to communicate with a reservoir chamber (not shown) in the second reservoir 84.

Further, in the cylinder main body 82, there are provided a second hydraulic pressure chamber 98a for controlling the hydraulic brake pressure that is output from the output port 24a to the wheel cylinders 32FR, 32RL side, and a first hydraulic pressure chamber 98b for controlling the hydraulic brake pressure that is output from another output port 24b to the wheel cylinders 32RR, 32FL side.

By this configuration, the second back chamber 94a, the first back chamber 94b, the second hydraulic pressure chamber 98a, and the first hydraulic pressure chamber 98b are enclosing portions for the brake fluid in the cylinder main body 82, and are partitioned from the mechanism housing section 173a of the actuator housing 172 with tight fluid sealing by the guide piston 90c, which has a function as a seal member.

Incidentally, the method for fitting the guide piston 90c to the cylinder main body 82 is not limited, and for example, the guide piston 90c may be fitted to the cylinder main body 82 by a circlip (not shown).

A restricting unit 100 is provided between the second slave piston 88a and the first slave piston 88b to restrict the maximum stroke (the maximum displacement distance) and the minimum stroke (the minimum displacement distance) of the second slave piston 88a and the first slave piston 88b. Further, the first slave piston 88b is provided with a stopper pin 102 that restricts the sliding range of the first slave piston 88b and inhibits over return of the first slave piston 88b to the second slave piston 88a side. Thus, particularly during backup with braking by the master cylinder 34, a defect of another system can be prevented at the time of a defect of one system has occurred.

The VSA device 18 is a known one and includes a second brake system 110a for controlling the second hydraulic pressure system 70a connected to the disk brake mechanisms 30a, 30b (wheel cylinders 32FR, 32RL) of the front right wheel WFR and the rear left wheel WRL, and a first brake system 110b for controlling the first hydraulic pressure system 70b connected to the disk brake mechanisms 30c, 30d (wheel cylinders 32RR, 32FL) of the rear right wheel WRR and the front left wheel WFL. Incidentally, the second brake system 110a may be a hydraulic pressure system connected to the disk brake mechanisms provided at the front left wheel WFL and the front right wheel WFR, and the first brake system 110b may be a hydraulic pressure system connected to disk brake mechanisms provided at the rear right wheel WRR and the rear left wheel WRL. Further, the second brake system 110a may be a hydraulic pressure system connected to disk brake mechanisms provided at the front right wheel WFR and the rear right wheel WRR on one side of the vehicle body, and the first brake system 110b may be a hydraulic pressure system connected to disk brake mechanisms provided at the front left wheel WFL and the rear left wheel WRL on the other one side of the vehicle body.

As the second brake system 110a and the first brake system 110b have the same structure, the same reference symbols are assigned to elements corresponding to each other between the second brake system 110a and the first brake system 110b. In the following, the second brake system 110a will be mainly described while describing the first brake system 110b with bracketed notes.

The second brake system 110a (the first brake system 110b) has shared hydraulic passages (a first shared hydraulic pressure passage 112 and a second shared hydraulic passage 114) shared by the wheel cylinders 32FR and 32RL (or 32RR and 32FL). The first shared hydraulic pressure passage 112 serves as a supply passage for supplying hydraulic brake pressures to the wheel cylinders 32FR, 32RL (or 32RR, 32FL).

The VSA device 18 includes regulator valves 116, which are normal-open type solenoid valves disposed between the inlet ports 26a (26b) and the first shared hydraulic passages 112, first check valves 118 that are arranged in parallel with the regulator valves 116 to allow the brake fluid to flow from the inlet port 26a (26b) sides to the first shared hydraulic passages 112 sides (while inhibiting the brake fluid from flowing from the first shared hydraulic passages 112 sides to the inlet port 26a (26b) sides), and first invalves 120, which are normal open type solenoid valves disposed between the first shared hydraulic passages 112 and the first outlet port 28a (fourth outlet port 28d).

Further, the VSA device 18 includes second check valves 122 that are arranged in parallel with the first invalves 120 and allow the brake fluid to flow from the first outlet port 28a (fourth outlet port 28d) sides to the first shared hydraulic passages 112 sides (while inhibiting the brake fluid from flowing from the first shared hydraulic passages 112 sides to the first outlet port 28a (fourth outlet port 28d) sides), second invalves 124, which are normal open type solenoid valves disposed between the first shared hydraulic passages 112 and the second outlet port 28b (third outlet port 28c), and third check valves 126 that are arranged in parallel to the second invalves 124 and allow the brake fluid to flow from the second outlet port 28b (third outlet port 28c) sides to the first shared hydraulic passage 112 sides (while inhibiting the brake fluid from flowing from the first shared hydraulic passages 112 sides to the second outlet port 28b (the third outlet port 28c) sides).

The first invalves 120 and the second invalves 124 are opening-closing units for opening and closing the hydraulic passages (the first shared hydraulic passages 112) for supplying hydraulic brake pressure to the wheel cylinders 32FR, 32RL, 32RR, 32FL. When the first invalves 120 are closed, supply of the hydraulic brake pressure from the first shared hydraulic passages 112 to the wheel cylinders 32FR, 32FL is shut off. When the second invalves 124 are closed, supply of the hydraulic brake pressure from the first shared hydraulic passages 112 to the wheel cylinders 32RR, 32RL is stopped.

Further, the VSA device 18 includes first outlet valves 128, which are normal close type solenoid valves disposed between the first outlet port 28a (the fourth outlet port 28d) and the second shared hydraulic passages 114, second outlet valves 130, which are normal close type solenoid valves disposed between the second outlet port 28b (third outlet port 28c) and the second shared hydraulic passages 114, reservoirs 132 connected to the second shared hydraulic passages 114, fourth check valves 134 that are disposed between the first shared hydraulic passages 112 and the second shared hydraulic passages 114 to allow the brake fluid to flow from the second shared hydraulic passages 114 sides to the first shared hydraulic passages 112 sides (while inhibiting the brake fluid from flowing from the first shared hydraulic passages 112 sides to the second shared hydraulic passages 114 sides), pumps 136 that are disposed between the fourth check valves 134 and the first shared hydraulic passages 112 to supply the brake fluid from the second shared hydraulic passages 114 sides to the first shared hydraulic passages 112 sides, intake valves 138 and discharge valves 140 provided before and after the pumps 136, a motor M for driving the pumps 136, and suction valves 142, which are normal close type suction valves disposed between the second shared hydraulic passages 114 and the inlet port 26a (the inlet port 26b).

Incidentally, in the second brake system 110a, on the hydraulic passage adjacent to the inlet port 26a, there is provided a pressure sensor Ph to measure the hydraulic brake pressure that is output from the output port 24a of the motor cylinder device 16 and controlled by the second hydraulic pressure chamber 98a of the motor cylinder device 16. Measurement signals measured by the respective pressure sensors Pm, Pp, and Ph are input to the control unit 150. Further, the VSA device 18 is capable of operating antilock control by an ABS (antilock brake system) in addition to VSA control.

Still further, instead of the VSA device 18, an ABS device having only an ABS function may be connected.

Incidentally, the motor cylinder device 16 and the VSA device 18 in the present embodiment are controlled by the control unit 150. Instead of this arrangement, a control section (not shown) for controlling the VSA device 18 and a control section (not shown) for controlling the motor cylinder device 16 may be respectively provided.

The vehicular brake system 10 in the present embodiment is configured basically as described above, and the operation and advantages thereof will be described below.

Incidentally, the configuration for antilock control may include an EDC (engine drag control) for controlling the torque of the electrical motor 200 (or an engine).

That is, the configuration may be arranged such that an EDC operates when antilock control is activated.

During normal operation in which the vehicular brake system 10 normally functions, the second shut-off valve 60a and the first shut-off valve 60b, which are normal open type solenoid valves, are magnetically excited to enter a valve closed state, and the third shut-off valve 62, which is a normal close type solenoid valve is magnetically excited to enter a valve open state. Accordingly, as the second hydraulic pressure system 70a and the first hydraulic system 70b are shut off by the second shutoff valve 60a and the first shutoff valve 60b, it does not occur that a hydraulic pressure generated by the master cylinder 34 of the input device 14 is transmitted to the wheel cylinders 32FR, 32RL, 32RR, 32FL of the disk brake mechanisms 30a to 30d.

Herein, a hydraulic pressure generated by the first pressure chamber 56b of the master cylinder 34 is transmitted to the hydraulic pressure chamber 65 of the stroke simulator 64 through the branched hydraulic pressure passage 58c and the third shutoff valve 62 in a valve open state. By this hydraulic pressure provided to the hydraulic pressure chamber 65, the simulator piston 68 is displaced against the spring force of the first and second return springs 66a, 66b, the stroke of the brake pedal 12 is thereby permitted, and a pseudo pedal reaction force is generated to be applied to the brake pedal 12. As a result, a brake feeling, which is not strange to the driver, can be obtained.

In such a system status, when the control unit 150 has detected pedaling of the brake pedal 12 by the driver, the control unit 150 determines that braking is in operation, drives the electrical motor 72 of the motor cylinder device 16 to operate the actuator mechanism 74, and thus displaces the second slave piston 88a and the first slave piston 88b toward the direction represented by arrow X1 in FIG. 1 against the spring force of the second return spring 96a and the 96b. By these displacements of the second slave piston 88a and the first slave piston 88b, the brake fluid in the second hydraulic pressure chamber 98a and the brake fluid in the first hydraulic pressure chamber 98b are pressurized such as to be balanced, and a desired hydraulic brake pressure is generated.

Concretely, the control unit 150 computes a pedaling operation amount (hereinafter, referred to as 'brake operation amount', as appropriate) of the brake pedal 12, corresponding to the measured value of the pedal stroke sensor St. Based on this brake operation amount and taking into account a regenerative braking force Pmot, the control unit 150 sets a hydraulic brake pressure as a target, and makes the motor cylinder device 16 generate the set hydraulic brake pressure.

As shown in FIG. 2A, the control unit 150 (see FIG. 1) computes a braking force (requested braking force Preq requested by the driver) as a target, based on the brake operation amount. For example, if a map representing the relation between brake operation amount and requested braking force Preq is set in advance and stored in the storage section (a later-described ROM or the like) of the control unit 150, the control unit 150 can compute a requested braking force Preq corresponding to a brake operation amount, referring to this map.

Further, the control unit 150 (see FIG. 1) provides an instruction to the regeneration control device 201 (see FIG. 1) connected to the electrical motor 200 (see FIG. 1), and thereby switches the regeneration control device 201 such as to charge the battery 202 (see FIG. 1) with a power generated by the electrical motor 200.

Then, the control unit 150 computes a braking force obtained by subtracting a regenerative braking force Pmot, which is generated by that the electrical motor 200 generates a regenerative power, from the requested braking force Preq having been set, and makes this computed braking force the target value of friction braking force Poil. Further, the control unit 150 sets a hydraulic brake pressure for generation of the friction braking force Poil of this target value.

Incidentally, in a case of a vehicle provided with an engine, as a braking force (engine braking force Pen) by engine brake is applied to the driving wheels (for example, the front right wheel WFR, front left wheel WFL), the control unit 150 (see FIG. 1) sets a target value of friction braking force Poil to be smaller by an amount corresponding to an engine brake force Pen.

As shown in FIG. 2B, the control unit 150 performs regeneration control of the electrical motor 200 (see FIG. 1) through the regeneration control device 201 (see FIG. 1), and applies a regenerative braking force Pmot to the driving wheels (front right wheel WFR, front left wheel WFL), as shown by the diagonally shaded portion. Further, the control unit 150 controls the motor cylinder device 16 to generate a hydraulic brake pressure having been set. Thus, the hydraulic brake pressure generated by the motor cylinder device 16 is provided from the inlet ports 26a, 26b to the VSA device 18, and further, provided from the VSA device 18 to the respective wheel cylinders 32FR, 32RL, 32RR, 32FL. Thus, the friction braking force Poil is applied to the all wheels, in other words, the driving wheels (the front right wheel WFR, the front left wheel WFL) and non-driving wheels (the rear left wheel WRL, the rear right wheel WRR).

That is, the vehicular brake system 10 in the present embodiment is arranged such that the motor cylinder device 16 generates a hydraulic brake pressure computed by the control unit 150, and further, the hydraulic brake pressure generated by the motor cylinder device 16 is supplied to the respective wheel cylinders 32FR, 32RL, 32RR, 32FL so that a friction braking force Poil is applied to all the wheels. Accordingly, in the present embodiment, an electrical brake unit is configured, including the control unit 150, the motor cylinder device 16, and the respective wheel cylinders 32FR, 32RL, 32RR, and 32FL.

In such a manner, by the vehicular brake system 10 during braking, a regenerative braking force Pmot and a friction braking force Poil are applied to the driving wheels (the front right wheel WFR, the front left wheel WFL), and the friction braking force Poil is applied to the no-driving wheels (the rear right wheel WRR, the rear left wheel WRL). As a result, as shown in FIG. 2B, a greater braking force is applied to the front wheels (the front right wheel WFR, the front left wheel WFL) compared with the braking force applied to the rear wheels (the rear right wheel WRR, the rear left wheel WRL), wherein both the regenerative braking force Pmot and the friction braking force Poil are applied to the front wheels (the front right wheel WFR, the front left wheel WFL) while only the friction braking force Poil is applied, is applied to the rear wheels (the rear right wheel WRR, the rear left wheel WRL).

Description returns to the description of FIG. 1. The control unit 150 in the present embodiment is configured, for example, by a microcomputer including a CPU (Central Processing Unit), a ROM (Read Only Memory), a RAM (Random Access Memory), and the like, and peripherals. The control unit 150 is configured to execute programs stored in advance in the ROM by the CPU and control the vehicular brake system 10.

Electrical signals in the present embodiment are control signals for controlling the power for driving the electrical motor 72 and controlling the electrical motor 72.

An operation amount measuring unit for measuring the pedaling operation amount (brake operation amount) of the brake pedal 12 is not limited to a pedal stroke sensor St, an can be any sensor that can measure the pedaling operation amount of the brake pedal 12. For example, the pressure sensor Pm may be used as the operation amount measuring unit, and a hydraulic pressure measured by the pressure sensor Pm may be converted into the pedaling operation amount of the brake pedal 12, or a pedal effort sensor (not shown) may measure the pedaling operation amount (brake operation amount) of the brake pedal 12.

The hydraulic brake pressures of the second hydraulic pressure chamber 98a and the first hydraulic pressure chamber 98b are transmitted through the first and second invalves 120, 124 of the VSA device 18, the invalves 120, 124 being in a valve open state, to the wheel cylinders 32FR, 32RL, 32RR, 32FL of the disk brake mechanisms 30a to 30d, and the wheel cylinders 32FR, 32RL, 32RR, 32FL operate to apply a desired braking force to the respective wheels.

In other words, by the arrangement of the vehicular brake system 10 in the present embodiment, during a normal state where the motor cylinder device 16 functioning as a hydraulic pressure source for movement power and the control unit 150 for, by-wire control, and the like are operable, a so-called brake by-wire type brake system becomes active, wherein, in the so-called brake by-wire type brake system, in a state where communications between the master cylinder 34, which generates a hydraulic brake pressure generated by an operator's pedaling of the brake pedal 12, and the disk brake mechanisms 30a-30d (wheel cylinders 32FR, 32RL, 32RR, an 32FL) that brake the respective wheels are shut off by the first shut-off valve 60b and the second shut-off valve 60a, the disk brake mechanisms 30a-30d are operated by the hydraulic brake pressure generated by the motor cylinder device 16. Consequently, in the present embodiment, the present invention can be suitably applied to a vehicle, for example, an electrical vehicle, in which no negative pressure caused by a conventionally used internal combustion engine exists.

On the other hand, during an abnormal state when the motor cylinder device 16 or the like is inoperable, a so-called conventional hydraulic type brake system becomes active, wherein, in the so-called conventional hydraulic type brake system, the second shut-off valve 60a and the first shut-off valve 60b are respectively made in a valve open state, and the third shut-off valve 62 is made in a valve close state so as to transmit hydraulic brake pressure generated by the master cylinder 34 to the disk brake mechanisms 30a-30d (wheel cylinders 32FR, 32RL, 32RR, 32FL) as a hydraulic brake pressure, and thereby operate the disk brake mechanisms 30a-30d (wheel cylinders 32FR, 32RL, 32RR, and 32FL).

When a hydraulic brake pressure is transmitted to the wheel cylinders (32FR, 32RL, 32RR, 32FL) of the disk brake mechanisms 30a to 30d and braking force is applied to the respective wheels (the front right wheel WFR, the rear left wheel WRL, the rear right wheel WRR, the front left wheel WFL), the control unit 150 in the present embodiment obtains wheel speeds of the respective wheels, based on measurement signals transmitted from the wheel speed sensors 35a to 35d, and further computes the slip ratios of the respective wheels from the obtained wheel speeds. Then, when the control unit 150 determines that at least one of the slip ratios of the wheels is larger than a predetermined value, the antilock control is activated. Hereinafter, a wheel with a slip ratio larger than the predetermined value will be referred to as 'slip wheel'. That is, when the control unit 150 determines that at least one slip wheel has occurred, the control unit 150 activates the antilock control. Incidentally, for a technology for the control unit 150 to compute the slip ratios of the respective wheels, a known technology can be adopted.

When the control unit 150 activates the antilock control, the control unit 150 closes the corresponding invalve (the first invalve 120 or the second invalve 124) to shut off the supply of hydraulic brake pressure to the disk brake mechanism 30a-30d arranged at the slip wheel. Further, the control unit 150 opens the outvalve (the first outvalve 128 or the second outvalve 130) arranged on the same hydraulic passage as the passage on which the closed invalve is arranged, and thereby introduce the brake fluid in the hydraulic passage on which the closed invalve is arranged into a reservoir 132. Thus, the hydraulic brake pressure, which is supplied to the wheel cylinder (32FR, 32RL, 32RR, 32FL) connected to the hydraulic passage on which the closed valve is arranged, is decreased so that the friction braking force Poil applied to the wheel provided with this wheel cylinder decreases. Thus, the friction braking force Poil applied to the slip wheel decreases.

Further, when the control unit 150 has determined that the wheel speed of the wheel (slip wheel), for which the friction braking force Poil has decreased, has become equal to the wheel speed of other wheels, the control unit 150 opens the closed invalve (the first invalve 120 or the second invalve 124) and closes the opened outvalve (the first outvalve 128 or the second outvalve 130). Thus, the hydraulic brake pressure supplied to the wheel cylinder (32FR, 32RL, 32RR, 32FL), for which the hydraulic brake pressure has been decreased, is increased, and the decrease in the friction braking force Poil applied to the wheel (slip wheel) provided with this wheel cylinder is stopped so that the friction braking force Poil increases (recovers).

In such a manner, when the control unit 150 has determined that a slip wheel has occurred, the control unit 150 operates the motor cylinder device 16 and the VSA device 18, thus activates the antilock control, and decreases and increases (recovers) the friction braking force Poil applied to the slop wheel. In such a manner, the control unit 150 stops slippage of the slip wheel. Accordingly, in the present embodiment, an antilock control unit includes a VSA device 18 and a control unit 150 which controls the VSA device 18 so as to activate the antilock control.

Incidentally, the control unit 150 drives a pump 136 appropriately while the antilock control is activated, and supplies the brake fluid, which has been introduced in the reservoir 132, from the second shared hydraulic pressure passage to the first shared hydraulic passage 112.

Further, if an EDC is activated when the antilock control is activated, the antilock control unit may includes an electrical motor 200 (or an engine) and an engine control unit (not shown).

In this case, when the control unit 150 activates the antilock control, the control unit 150 provides an instruction to the engine control unit or the like to adjust the torque of the electrical motor 200 (or the engine). Further, the control unit 150 can be configured to control the VSA device 18 such that friction braking force Poil with consideration of a braking force generated by adjusting the torque of the electrical motor 200 (or the engine) is applied to the respective wheel (the front right wheel WFR, the rear left wheel WRL, the rear right wheel WRR, the front left wheel WFL).

Figure 3A:
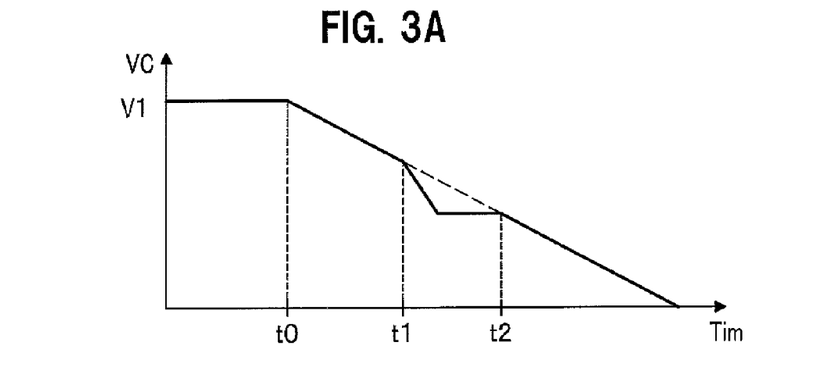
FIG. 3A shows a graph representing variation in the vehicle speed during braking.
Figure 3B:
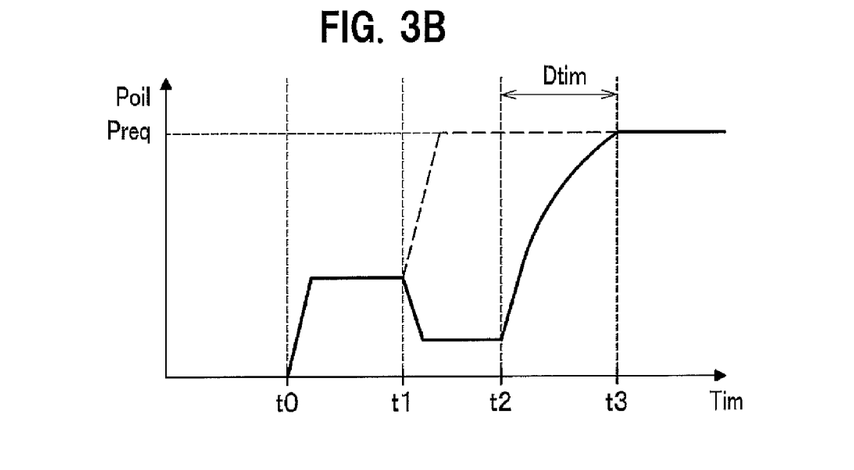
FIG. 3B shows a graph representing variation in friction braking force generated on the vehicle.
Figure 3C:
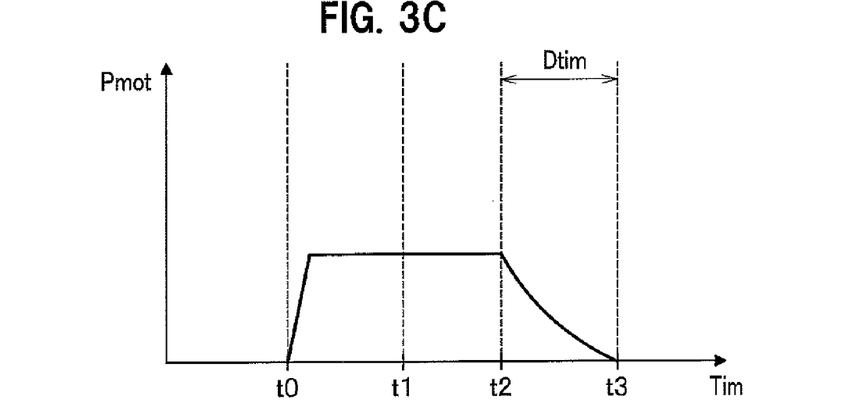
FIG. 3C shows a graph representing variation in regenerative braking force generated on the vehicle.

FIG. 3A shows a graph representing variation in the vehicle speed during braking, FIG. 3B shows a graph representing variation in the friction braking force generated on the vehicle, and FIG. 3C shows a graph representing variation in the regenerative braking force generated on the vehicle.

In FIG. 3A, the vertical axis represents vehicle speed (VC), and the horizontal axis represents time (Tim). In FIG. 3B, the vertical axis represents friction braking force Poil, and the horizontal axis represents time (Tim). In FIG. 3C, the vertical axis represents regenerative braking force Pmot, and the horizontal axis represents time (Tim).

Incidentally, the friction braking force Poil shown in FIG. 3B and the regenerative braking force Pmot shown in FIG. 3C respectively show the entirety of the friction braking force Poil and the regenerative braking force Pmot generated on the vehicle.

In the following, referring to FIGS. 1 to 3, as appropriate, variation in the braking forces (friction braking force Poil, regenerative braking force Pmot) generated on the vehicle and the vehicle speed will be described.

As shown in FIG. 3A, when the vehicle is running at a vehicle speed V1, if the driver performs pedaling operation of the brake pedal 12 at time t0, the control unit 150 computes a requested braking force Preq, corresponding to the brake operation amount. Further, as shown in FIG. 2B, the control unit 150 applies regenerative braking force Pmot and friction braking force Poil to the respective wheels (front right wheel WFR, front left wheel WFL, rear right wheel WRR, rear left wheel WRL), in other words, uses both the regenerative braking force Pmot and the friction braking force Poil to make the vehicle generate a braking force to be the requested braking force Preq and thus decelerates the vehicle speed.

Further, as described above, the control unit 150 obtains the wheel speeds of the respective wheels, based on measurement signals from the wheel speed sensors 35a to 35d. Then, when the control unit 150 has determined that the slip ratio of any wheel has become larger than the predetermined value (has determined that at least one slip wheel has occurred), for example, at time t1, the control unit 150 activates the antilock control.

When the control unit 150 activates the antilock control (a pressure decreasing control in the antilock control) at time t1, the control unit 150 sets a target value of friction braking force Poil to the requested braking force Preq having been set based on the brake operation amount; sets a hydraulic brake pressure that generates the friction braking force Poil to be the target value (in other words, the requested braking force Preq); and controls the motor cylinder device 16 to thereby generate the set hydraulic brake pressure. Thus, the hydraulic brake pressure generated by the motor cylinder device 16 at time t1 increases, and the hydraulic brake pressure of the first shared hydraulic passage 112 of the VSA device 18 increases. The hydraulic brake pressure of the first shared hydraulic passage 112 increases up to a pressure in a case of generating a requested braking force Preq without generating a regenerative braking force Pmot (shown by thick dashed line in FIG. 3B).

On the other hand, as shown in FIG. 3C, the control unit 150 maintains the regenerative braking force Pmot applied to the driving wheels (the front right wheel WFR, the front left wheel WFL). Accordingly, the regenerative braking force Pmot generated on the vehicle is maintained constant (the regenerative braking force Pmot is not decreased). That is, the control unit 150 (antilock control unit) maintains the Pmot constant while the antilock control is activated. Thus, while the antilock control is activated, the regenerative braking force Pmot does not decrease even when the motor cylinder device 16 operates and the hydraulic brake pressure increases. While the antilock control is activated, the motor cylinder device 16 increases or decreases the hydraulic brake pressure (operating pressure). Incidentally, even in case that the motor cylinder device 16 increases the hydraulic brake pressure and the slip ratio of a wheel exceeds the predetermined values, it is possible to prevent the wheel from locking by the antilock control.

Incidentally, it is possible that the braking force generated by the regenerative braking force Pmot and the friction braking force Poil exceeds the requested braking force Preq. However, if decrease in the slip ratio of a wheel becomes excessive, the friction braking force Poil is decreased by the antilock control. Accordingly, an excessive braking force is not generated.

Further, the control unit 150 may maintain the regenerative braking force Pmot constant without generating a hydraulic brake pressure at time t1 by the motor cylinder device 16.

By this arrangement, an excessive braking force is not generated compared with a case that the motor cylinder device 16 increases the hydraulic brake pressure.

Incidentally, the control unit 150 may be configured to subtract a value corresponding to the friction braking force Poil (a braking force corresponding to the friction braking force Poil) applied to the non-driving wheels (rear left wheel WRL, rear right wheel WRR) from the regenerative braking force Pmot applied to the driving wheels (front right wheel WFR, front left wheel WFL). By this arrangement, the regenerative braking force Pmot which is applied while the antilock control is activated decreases, and generation of an excessive braking force is inhibited.

Then, the control unit control unit 150 closes the invalve (the first invalve 120 or the second invalve 124) arranged on the hydraulic passage (the first shared hydraulic passage 112) supplying brake fluid to the slip wheel and opens the outvalve (the first outvalve 128 or the second outvalve 130) arranged on the same hydraulic passage.

By opening the outvalve (the first outvalve 128 or the second outvalve 130), as the brake fluid on the hydraulic passage on which this outvalve is arranged is introduced to the reservoir 132, the hydraulic brake pressure in this hydraulic passage decreases. Thus, the friction braking force Poil applied to the slip wheel decreases, and the friction braking force Poil generated on the vehicle decreases (time t1→time t2), as shown in FIG. 3B.

The control unit 150 monitors the wheel speeds of the respective wheels by measurement signals measured by the wheel speed sensors 35a to 35d, and maintains this state until the wheel speed of the slip wheel becomes the same as the wheel speeds of the other wheels. When the control unit 150 has determined that the wheel speed of the slip wheel has become the same as the wheel speeds of the other wheels (time t2), the control unit 150 opens the closed invalve (the first invalve 120 or the second invalve 124) and further closes the opened outvalve (the first outvalve 128 or the second outvalve 130). Incidentally, even when the control unit 150 has determined that the slip of the wheel has stopped at time t2 before the invalve or the outvalve has not yet actually opened or closed, the control unit 150 opens the invalve and closes the outvalve (The control unit 150 provides an instruction to the invalve to open and an instruction to the outvalve to close.)

The wheel cylinder (32FR, 32RL, 32RR, 32FL) arranged on the hydraulic passage on which the invalve having been opened is supplied with the hydraulic brake pressure maintained in the first shared hydraulic passage 112 at a pressure for generating the requested braking force Preq. Thus, the wheel cylinder of the slip wheel is supplied with a hydraulic brake pressure for generating the requested braking force Preq.

However, in the state at time t2, the friction braking force Poil has been decreased by the antilock control. Further, it takes a certain time from when the invalve is opened until the brake fluid reaches from the first shared hydraulic passage 112 to the wheel cylinder. Consequently, as shown by the solid curve in FIG. 3B, a certain delay time Dtim (time from time t2 to time t3) is caused before the friction braking force Poil generated on the vehicle increases up to the requested braking force Preq.

Further, for example, when the control unit 150 performs control to increase the friction braking force Poil, if the control unit 150 decreases the regenerative braking force Pmot before this increase, the braking force generated on the vehicle results in becoming smaller than the requested braking force Preq.

That is, from time t2 to time t3, the friction braking force Poil generated on the vehicle becomes smaller than the requested braking force Preq. In this situation, the control unit 150 in the present embodiment performs control to generate a regenerative braking force Pmot such as to compensate the shortage in the braking force of the friction braking force Poil, the shortage being the difference from the requested braking force Preq.

Concretely, at time t2, the control unit 150 generates a regenerative braking force Pmot such that the requested braking force Preq is generated on the vehicle by the use of both the friction braking force Poil and the regenerative braking force Pmot. In such a manner, generation of an excessive braking force is inhibited in such a case as a case of a rapid change from a state where the friction coefficient of the road surface is small (small →) to a state where the friction coefficient is large (large μ). Thereafter, the control unit 150 decreases the regenerative braking force Pmot until time t3, corresponding to an increase in the friction braking force Poil generated on the vehicle. For example, the control unit 150 provides an instruction to the regeneration control device 201 to decrease the power generation amount of regenerative power by the electrical motor 200 to thereby decrease the regenerative braking force Pmot.

Herein, the control unit 150 provides an instruction to the regeneration control device 201 to decrease the regenerative braking force Pmot, according to a certain pattern.

For example, a pattern of decreasing the regenerative braking force Pmot during the delay time Dtim may be determined in advance with experimental measuring and the like, corresponding to the friction braking force Poil generated on the vehicle at time t2 and the brake operation amount (requested braking force Preq), and the decided pattern may be stored as data in a storage section (ROM) (not shown) of the control unit 150.

If a certain friction braking force Poil (fixed value) is generated on the vehicle by activating antilock control at time t2 when the wheel speed of a slip wheel becomes equal to the wheel speeds of the other wheels in a state where the antilock control is activated, it is possible, by experimental measuring and the like, to easily obtain the relation between the brake operation amount (requested braking force Preq) at time t2 and the delay time Dtim required from time t2 when the invalve opens until the friction braking force Poil generated on the vehicle increases up to the requested braking force Preq. Then, a pattern, in which the regenerative braking force Pmot gradually decreases to become '0' in the delay time Dtim, can be decided for each brake operation amount by experimental measuring and the like.

Figure 4:
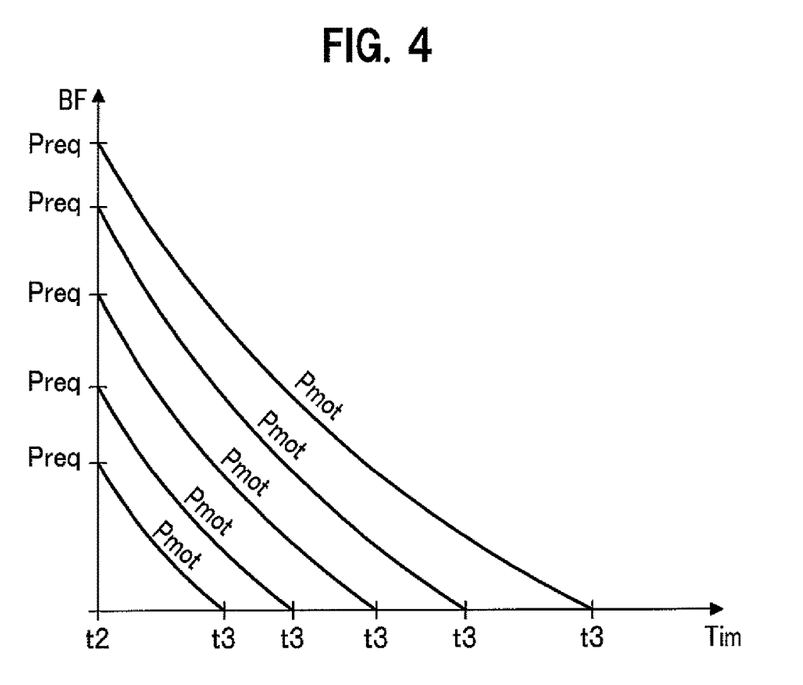
FIG. 4 shows examples of patterns of decreasing regenerative braking force.

FIG. 4 shows examples of patterns of decreasing the regenerative braking force. The horizontal axis represents time (Tim), and the vertical axis represents braking force (BF).

The larger the requested braking force Preq at time t2 shown in FIG. 3B, the longer the time (delay time Dtim) required for the friction braking force Poil to increase up to the requested braking force Preq. Accordingly, in a pattern of decreasing the regenerative braking force, as shown in FIG. 4, the larger the requested braking force Preq at time t2, the longer the time from time t2 to time t3, and the larger the requested braking force Preq, the longer the time taken from t2 for the regenerative braking force Pmot to decrease down to '0'. In such a manner, a pattern of decreasing the regenerative braking force Pmot is determined, corresponding to the requested braking force Preq at time t2, and is different, depending on the requested braking force Preq.

Then, as shown in FIG. 3C, at time t2 when the control unit 150 determines that the wheel speed of the slip wheel has become equal to the wheel speed of the other wheels, the control unit 150 opens the closed invalve (first invalve 120 or the second invalve 124) and closes the opened outvalve (the first outvalve 128 or the second outvalve 130). Further, the control unit 150 selects a pattern corresponding to the requested braking force Preq at time t2 from data shown in FIG. 4 (graphs), and decreases the regenerative braking force Pmot until time t3, according to the selected pattern.

Thus, antilock control is activated so that a braking force that is substantially equal to the requested braking force Preq is generated on the vehicle from time t2 when the wheel speed of the slip wheel becomes equal to the wheel speed of the other wheels. That is, from time t2 to time t3, a braking force that is substantially equal to the requested braking force Preq is generated on the vehicle by the use of both the friction braking force Poil and the regenerative braking force Pmot. Then, from time t3, the requested braking force Preq is generated on the vehicle by the friction braking force Poil. Accordingly, from time t2, a braking force substantially equal to the requested braking force Preq corresponding to the brake operation amount is generated on the vehicle, and a strange feeling to the driver performing pedaling operation of the brake pedal 12 is reduced. Further, shortage in the braking force generated on the vehicle can be avoided.

Further, once the control unit 150 in the present embodiment has started antilock control, the control unit 150 activates the antilock control until the slip of a wheel stops. Accordingly, the control unit 150 determines that the slip of the wheel has stopped (time t2) when the wheel speed of the slip wheel has become equal to the wheel speed of the other wheels, or the wheel speeds of all the wheels have become a wheel speed corresponding to the vehicle speed. Then, when the control unit 150 has determined that the slip of the slip wheel has stopped, the control unit 150 increases the friction braking force Poil and decreases the regenerative braking force Pmot in a state (pressure increasing control of antilock control) where the antilock control is activated.

Thus, if a slip wheel occurs after time t3, the control unit 150 increases or decreases the friction braking force Poil to enable appropriate stopping of the slip of the slip wheel.

As has been described above, the vehicular brake system 10 (shown in FIG. 1) in the present embodiment applies a braking force to the respective wheels (front right wheel WFR, rear left wheel WRL, rear right wheel WRR, front left wheel WFL), using both a friction braking force Poil by a hydraulic brake pressure generated by the motor cylinder device 16 and a regenerative braking force Pmot by power generation of regenerative power by the electrical motor 200.

Further, when the slip ratio of at least one wheel has become larger than a predetermined value and a slip wheel has occurred, the antilock control is activated so as to ensure the stability of the vehicle. When the antilock control is activated, the friction braking force Poil of the slip wheel is decreased in order to stop the slip of the slip wheel. Then, when the slip of this wheel has been stopped, the friction braking force Poil is increased (recovered) up to a requested braking force Preq requested by the driver.

Herein, on the vehicular brake system 10 in the present embodiment, the shortage in braking force is compensated by the regenerative braking force Pmot while the friction braking force Poil increases up to the requested braking force Preq. Thus, after decreasing the friction braking force Poil by the antilock control is quit, a braking force corresponding to the requested braking force Preq is quickly generated on the vehicle by the use of both the friction braking force Poil and the regenerative braking force Pmot. Accordingly, a strange feeling to the driver performing pedaling operation of the brake pedal 12 is reduced.

Incidentally, within a range without departing from the spirit of the invention, changes and modifications of design can be made, as appropriate.

For example, if the slip ratio of at least one slip wheel has become smaller than or equal to a predetermined value when the control unit 150 (shown in FIG. 1) activates the antilock control, the control unit 150 may close a suction valve 142 and a regulator valve 116 of the VSA device 18, and further may provide an instruction to the motor cylinder device 16 to decrease the hydraulic brake pressure that the motor cylinder device 16 generates.

By this arrangement, the suction valve 142 and the regulator valve 116 function as shutoff valves provided between the motor cylinder device 16 and the first shared hydraulic passage 112. The control unit 150 closes the shutoff valve provided between the motor cylinder device 16 and the first shared hydraulic passage 112 to thereby shut off supply of hydraulic brake pressure from the motor cylinder device 16 to the first shared hydraulic passage 112.

Further, when the control unit 150 activates the antilock control, if the slip ratio of at least one slip wheel has become larger than a predetermined value, the control unit 150 may decrease the hydraulic brake pressure generated by the motor cylinder device 16 (decreases the friction braking force Poil) and/or the regenerative braking force Pmot.

By closing the suction valve 142 and the regulator valve 116, a hydraulic pressure supply passage for supplying a hydraulic pressure generated by the motor cylinder device 16 to the first shared hydraulic passage 112 of the VSA device 18 is closed. Consequently, even if the hydraulic brake pressure generated by the motor cylinder device 16 decreases, the hydraulic brake pressure in the first shared hydraulic passage 112 of the VSA device 18 does not decrease. Then, the control unit 150 opens the closed invalve (the first invalve 120 or the second invalve 124) and closes the opened outvalve (the first outvalve 128 or the second outvalve 130) so as to supply the brake fluid in the first shared hydraulic passage 112 to the wheel cylinder (32FR, 32RL, 32RR, 32FL).

Further, the control unit 150 drives the pump 136 of the VSA device 18 to thereby feed the brake fluid introduced in the reservoir 132 to the first shared hydraulic passage 112, and thus increases the hydraulic brake pressure in the first shared hydraulic passage 112. Thus, the hydraulic brake pressure supplied to the wheel cylinder (32FR, 32RL, 32RR, 32FL) increases so that the friction braking force Poil generated on the vehicle increases.

Also by such an arrangement, a delay time Dtim is caused by the flow of the brake fluid from the first shared hydraulic passage 112 to the wheel cylinder, resulting in that the delay time Dtim is caused before the friction braking force Poil generated on the vehicle increases up to the requested braking force Preq. Accordingly, it is preferable that regenerative braking force Pmot is generated during the delay time to compensate the shortage in braking force of the friction braking force Poil, the shortage being the difference from the requested braking force Preq.

Further, although, in the present embodiment, the front wheels (front right wheel WFR, front left wheel WFL) shown in FIG. 1 are driving wheels, and the rear wheels (rear right wheel WRR, rear left wheel WRL) are non-driving wheels, it is also possible to apply the invention to a vehicle whose rear wheels are driving wheels and whose front wheels are non-driving wheels.

DESCRIPTION OF REFERENCE SYMBOLS

10: vehicular brake system
16: motor cylinder device (electrical brake actuator, electrical braking unit)
18: VSA device (antilock control unit)
32FR, 32RL, 32RR, 32FL: wheel cylinder (electrical braking unit)
112: first shared hydraulic passage (supply passage for supplying operational pressure)
116: regulator valve
120: first invalve (opening/closing unit)
124: second invalve (opening/closing unit)
136: pump
142: suction valve
150: control unit (control unit for controlling electrical braking unit, regenerative braking unit, and antilock control)
200: electrical motor (regenerative braking unit)
201: regeneration control device (regenerative braking unit)
WFR: front right wheel (driving wheel, wheel)
WFL: front left wheel (driving wheel, wheel)
WRR: rear right wheel (non-driving wheel, wheel)
WRL: rear left wheel (non-driving wheel, wheel)

The invention claimed is:

1. A vehicular brake system, comprising:
an electrical braking unit that supplies operational pressure generated in operational fluid by an electrical brake actuator to wheel cylinders and thereby applies friction braking force to wheels,
wherein said wheels include front wheels which are driving wheels and rear wheels which are non-driving wheels,
wherein the driving wheels are driven by an electric motor,
a regenerative braking unit which applies a regenerative braking force generated by the electric motor to only the driving wheels, and
an antilock control unit for activating antilock control that increases and decreases the friction braking force to stop slip of said wheels having a slip ratio larger than a predetermined value, identified as a slip wheel, wherein the slip wheel is at least one of the driving wheels,
wherein when the antilock control unit determines slip of said wheels has occurred and activates the antilock control, and the antilock control unit maintains a state where the regenerative braking force is applied to only the driving wheels while the antilock control is activated,
wherein while the antilock control is activated, the antilock control unit subtracts a braking force corresponding to the friction braking force applied to the non-driving wheels from the regenerative braking force applied to the driving wheels, to control the braking force generated, and
wherein when the antilock control unit determines that the slip ratio of the slip wheel has become smaller than or equal to a predetermined value, the antilock control unit opens an opening-closing unit for a supply passage supplying the operational pressure to the wheel cylinder provided at the slip wheel to supply the operational pressure from the supply passage to the wheel cylinder to increase the friction braking force applied to the slip wheel up to a requested braking force, and when the friction braking force generated on the vehicle increases up to the requested braking force, the regenerative braking force that is applied to the driving wheel by the regenerative braking unit gradually decreases to become "0", and
wherein the antilock control unit maintains the regenerative braking force constant while the antilock control is active and the friction braking force applied to the slip wheel decreases.

2. The vehicular brake system according to claim 1, wherein the antilock control unit increases and decreases the operational pressure by the electrical brake actuator while the antilock control is activated.

3. A vehicular brake system comprising:
an electrical braking unit that supplies operational pressure generated in an operational fluid by an electrical brake actuator to wheel cylinders and thereby applies friction braking force to wheels, wherein said wheels include front wheels which are driving wheels and rear wheels which are non-driving wheels, wherein said driving wheels are driven by an electric motor, a regenerative braking unit which applies a regenerative braking force generated by the electric motor to only the driving wheels; and an antilock control unit for activating antilock control to increase and decrease the friction braking force to stop slip of said wheels having a slip ratio larger than a predetermined value, identified as a slip wheel, wherein the slip wheel is one or both of the driving wheels, wherein the antilock control unit increases and decreases the operational pressure by the electrical brake actuator while the antilock control is activated, wherein the antilock control unit determines slip of one or more of said wheels and activates the antilock control, and the antilock control unit maintains a constant regenerative braking force to only the driving wheel, wherein at time $t_2$ when the antilock control unit determines that the slip ratio of the slip wheel has become smaller than or equal to a predetermined value, the antilock control unit opens an opening-closing unit for a supply passage supplying the operational pressure to the wheel cylinder provided at the slip wheel to supply the operational pressure from the supply passage to the wheel cylinder to increase the friction braking force applied to the slip wheel and decrease the regenerative braking force that is applied to the driving wheel by the regenerative braking unit at time $t_3$, and wherein when the friction braking is increased by the antilock control unit and there is a delay time from time $t_2$ to time $t_3$, equal to $D_{tim}$, in increase of the friction braking to meet a requested braking force, the antilock control unit performs a control to generate the regenerative braking force so that the requested braking force is generated on the vehicle by use of both the friction braking force and the regenerative braking force during the delay time $D_{tim}$, and wherein the antilock control unit maintains the regenerative braking force constant while the antilock control is active and the friction braking force applied to the slip wheel decreases.

* * * * *